H. T. BEAUREGARD.
CANE STRIPPER AND TOPPER.
APPLICATION FILED MAR. 5, 1909.
990,215.
Patented Apr. 25, 1911.
4 SHEETS—SHEET 1.
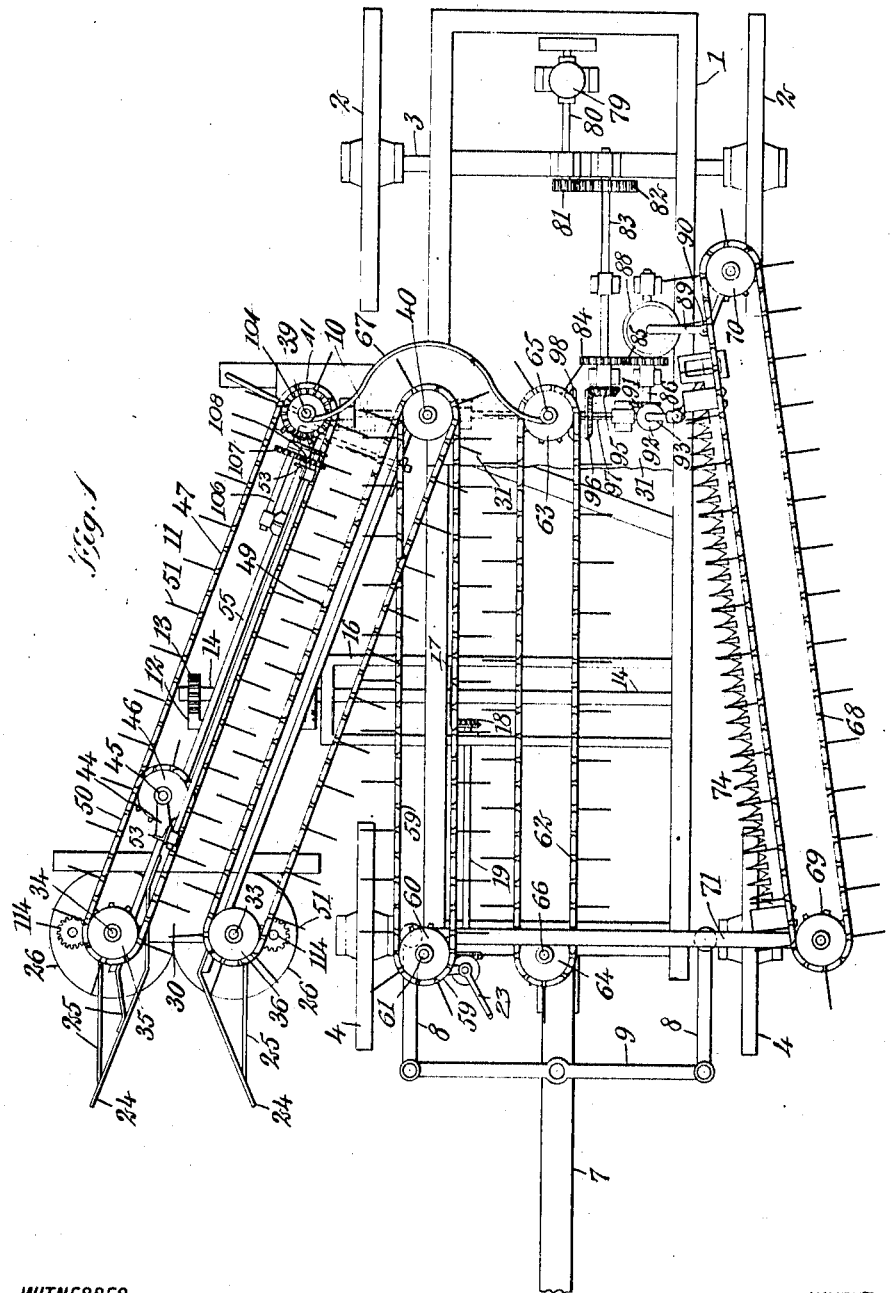
WITNESSES
F. D. Sweet
H. Whiting
INVENTOR
Henry T. Beauregard
BY
Munn & Co
ATTORNEYS

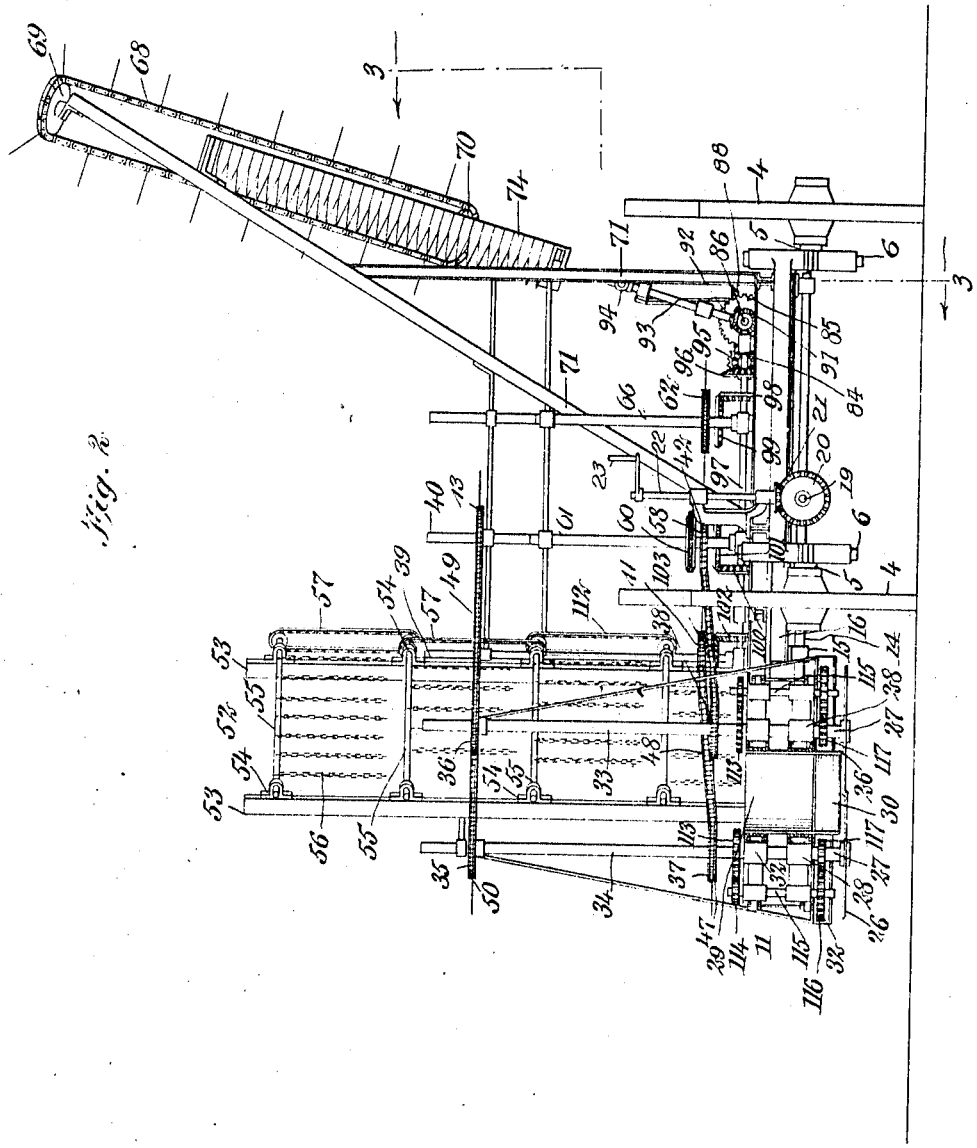

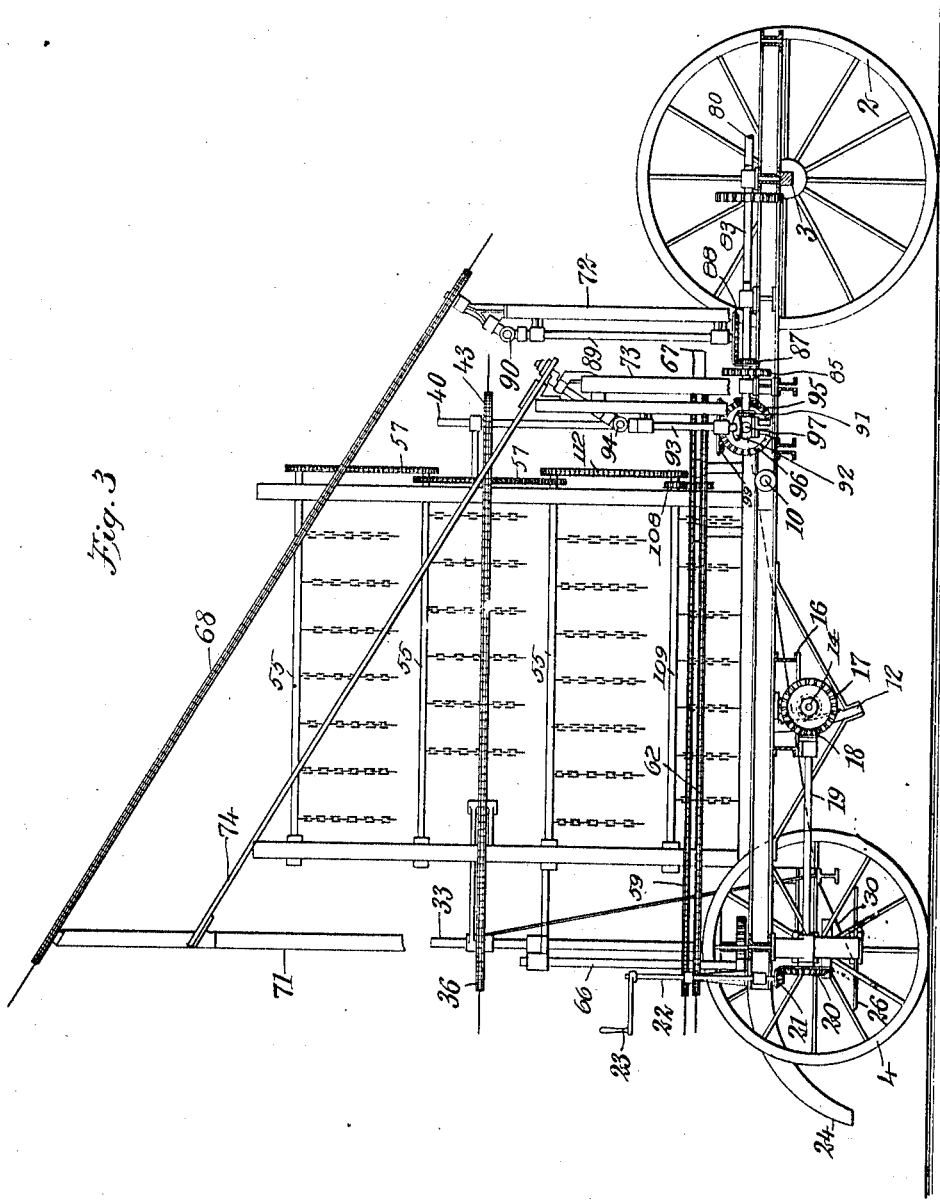

H. T. BEAUREGARD.
CANE STRIPPER AND TOPPER.
APPLICATION FILED MAR. 5, 1909.
990,215.
Patented Apr. 25, 1911.
4 SHEETS—SHEET 4.
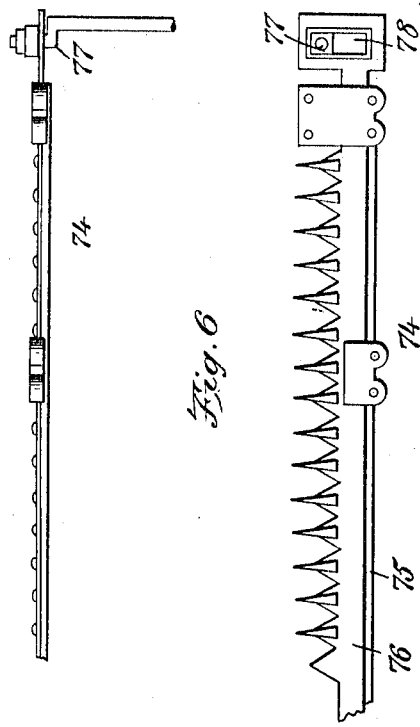
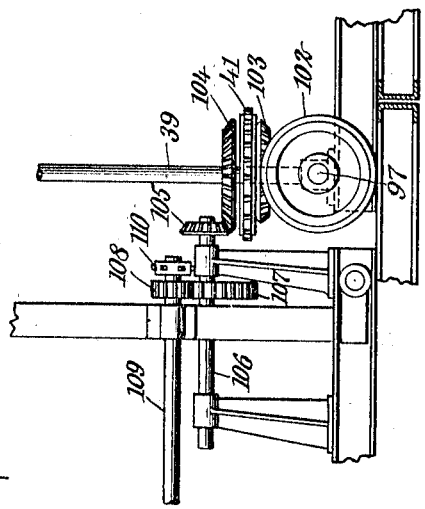
WITNESSES
INVENTOR
Henry T. Beauregard
BY
ATTORNEYS

UNITED STATES PATENT OFFICE.

HENRY TOUTANT BEAUREGARD, OF NEW ORLEANS, LOUISIANA, ASSIGNOR TO BEAUREGARD AGRICULTURAL IMPLEMENT COMPANY, A CORPORATION OF LOUISIANA.

CANE STRIPPER AND TOPPER.

990,215.  Specification of Letters Patent.  Patented Apr. 25, 1911.

Application filed March 5, 1909. Serial No. 481,312.

*To all whom it may concern:*

Be it known that I, HENRY T. BEAUREGARD, a citizen of the United States, and a resident of New Orleans, in the parish of Orleans and State of Louisiana, have invented a new and Improved Cane Stripper and Topper, of which the following is a full, clear, and exact description.

This invention relates to a new and improved device for stripping the leaves from sugar-cane and removing the tops or topping the same. This device is disclosed in this case as being connected with the mechanism for delivering the cane thereto as it is directly cut from the plant in the ground.

Sugar-cane grows anywhere from six to twelve feet in height, and it is desirable to chop the stalks off near the ground and then cut the top of each cane at about the same distance from the tip, leaving as little as possible of the stalk proper with the cut-off top. This is readily done when the stalks are cut by hand, but previous to this time, as far as I am aware, no device has been made for performing this operation mechanically. Some machines are made to strike an average and cut the tops off at a mean height, cutting some of the canes with a large part of the stalk with the top and missing the tops of some of the shorter canes altogether.

An object of this invention is to provide a machine which will cut the tops off the sugar cane or any other product, at substantially the same distance from the tip thereof, irrespective of the length of the stalk. In accomplishing this object, the stalk is first cut from the ground by means of a stalk chopper supported by an adjustable frame carried on a carriage, which is drawn by horses or the like. The cut stalks are conveyed to the carriage proper where they fall over onto a forwardly and upwardly-inclined guiding conveyer, which supports the stalks away from a forwardly and upwardly inclined top cutter. Advantage is here taken of the tendency of the stalk to sag under its weight, when the top of the stalk which rests against the guiding conveyer is not stout enough to support the weight. The stalks are moved along by the upwardly-inclined conveyer, until said stalks come to a point where the height of the resting point of the conveyer will reach a section in the stalk weak enough to permit it to sag against a reciprocating blade in the top cutter, and, as the stalks are smallest and weakest near the top, they will be cut off substantially at the same distance from the tip. This and further objects will be more fully described hereinafter and particularly pointed out in the claims.

Reference is to be had to the accompanying drawings forming a part of this specification, in which similar characters of reference indicate corresponding parts in all the views, and in which—

Figure 1 is a plan view of the cane harvester; Fig. 2 is an end elevation, looking at the harvester from the front and showing the guide to the stalk chopper broken away; Fig. 3 is a vertical longitudinal section on line 3—3 of Fig. 2. Fig. 4 is an enlarged detail view in elevation, of the driving mechanism of the stripper and conveyer; Fig. 5 is an enlarged view of the top cutter, showing the relation of the cutting knife to the cutter bar and operating means for the same; and Fig. 6 is a plan view of the same.

Referring more particularly to the separate parts of the device, 1 indicates the main carriage of the harvester. This carriage is supported at the rear by wheels 2 on the axle 3. The front of the carriage is supported by wheels 4 on stub axles 5, which are adapted to rotate in bearings 6 supported by the frame. These wheels are connected to a drive-pole 7 by means of levers 8 and a cross bar 9, so that any turning movement of the pole will turn the wheels and steer the carriage.

Rotatably supported on the carriage 1 in any suitable manner is a cross shaft 10, which pivotally supports the stalk chopper frame 11. The height of the front end of the frame 11 above the ground is adjusted in any suitable manner, but preferably by means of a curved rack 12 on the bottom thereof. This rack, together with the frame 11, is moved up and down by means of a pinion 13, which is supported on and rotated by a shaft 14, which in turn has supporting bearings 15 in a frame 16 carried by the carriage 1. This shaft 14 has a bevel gear 17 on the end thereof, which meshes with a bevel pinion 18 on a shaft 19, supported in any suitable manner by the carriage 1. On the other end of the shaft 19 is a bevel gear 20, which is engaged by a bevel pinion 21 on a vertical shaft 22, rotated by any suitable means such as a hand crank 23. Thus, by rotating this crank 23, the frame 11 may be rotated about the shaft 10 and the height of the forward end of the frame adjusted up and down.

Situated at the forward end of the frame are guides 24 which are preferably flared outwardly and curved downwardly. These guides are suitably braced as by means of the rods 25. These guides 24 are adapted to guide the cane stalks to the stalk choppers 26, which may be of any suitable form, but are preferably a pair of rotatable disk knives supported on shafts 27 carried in any suitable manner in bearings 28 on the forward end of the frame 11.

Extending from the choppers 26 to the carriage 1 and supported in any suitable manner by the frame 11 is a trough 29 which serves to guide the cut stalks from the chopper to the carriage. The end of the bottom or apron 30 of this trough 29 is placed preferably directly above the stalk choppers 26, from which it slopes up rather abruptly for a short distance and then more gradually until it reaches the level of an apron 31 on the carriage 1.

Pivotally supported in bearings 32 at the forward end of the frame 11 are vertical shafts 33 and 34. Fixed on these shafts 33 and 34, near the top and bottom thereof, are sprocket wheels 35, 36, 37 and 38. At the rear of the frame 11 and rotatably supported in any suitable manner are vertical shafts 39 and 40. The shaft 39 has a lower sprocket wheel 41 fastened thereto, and the shaft 40 has both a lower sprocket wheel 42 and an upper sprocket wheel 43 fastened thereto. Fastened to the frame in any suitable manner by a bracket 44 is a short shaft 45 on which a sprocket wheel 46 is adapted to rotate. These sprocket wheels are connected in pairs by endless chain conveyers 47, 48, 49 and 50. The endless conveyers 47, 48, and 49 extend the whole length of the frame 11 and coact by means of outwardly-extending fingers 51 thereon with the apron 30 and trough 29 to convey the cane stalks, as they are chopped off, from the chopper to the carriage 1. The conveyer 50 is a short conveyer, and merely assists in conveying the stalks for a short distance. The remainder of the distance on the frame 11 is taken up by the leaf-stripper 52. The stripper 52 consists preferably of vertically extending angle-irons 53 secured to the frame 11 in any suitable manner, and on which are supported at intervals in suitable bearings 54, shafts 55. These shafts 55 have strip-chains 56 hung at intervals thereon, and are adapted to be rotated by any suitable means, such as sprocket-chains 57. By rotating these shafts 55 at a high rate of speed, the chains 56 are swung through the cane stalks, and tear or strip off the lower leaves. The shaft 40 also carries another sprocket 58, which carries an endless conveyer chain 59. This conveyer 59 extends forward just above the apron 31 on the carriage 1, and passes around a sprocket 60 on a shaft 61, which is suitably supported on the carriage 1. Parallel to and co-acting with the conveyer 59 is an endless finger conveyer 62 mounted on sprockets 63 and 64, which are supported in any suitable manner by shafts 65 and 66 on the frame 1. These conveyers 59 and 62 are connected to the conveyers 47, 48 and 49 by means of a guiding boot 67, which serves to guide the stalks and at the same time tends to cause the stalks to fall away from the frame 11 and toward the guiding and supporting conveyer 68. This guiding conveyer 68 inclines upwardly and outwardly, and is carried by sprockets 69 and 70, which are supported in any suitable manner on the frames 71 and 72. These frames 71 and 72 are suitably supported on the carriage 1, and are suitably braced to give the required stiffness and strength. Substantially parallel to the guiding conveyer 68 and supported in any suitable manner by the frames 71 and 72 is the top cutter 74. This top cutter 74 consists of a cutter bar 75 and a knife 76. This knife 76 is of the ordinary saw-tooth variety, and is adapted to be reciprocated in the cutter bar 75 by means of a crank pin 77 working in a slot 78 in the end of the knife.

The power for driving the various parts is derived from any suitable motor 79, preferably a gasolene engine. This motor 79 drives a shaft 80, which drives by means of intermeshing gears 81 and 82, a shaft 83. This shaft 83 has intermediate its ends a gear 84 which meshes with a gear 85 on a shaft 86. This shaft 86 has a bevel gear 87 intermediate its ends, which drives a bevel gear 88, which in turn drives the sprocket 70 by means of a shaft 89 and a universal joint connection 90. On the end of the shaft 86 is a bevel gear 91, which meshes with a bevel gear 92 on a shaft 93, which drives, through a universal joint connection 94, the knife-reciprocating crank pin 77. On the end of the shaft 83 is a bevel gear 95, which meshes with a bevel gear 96 fixed on a counter or cross-shaft 97. On this shaft 97 is a bevel gear 98 meshing with a bevel gear 99 on the shaft 65, which drives the conveyer 62. Farther along on the shaft 97 is another bevel gear 100, which meshes with a bevel gear 101 on the vertical shaft 40, which drives the conveyers 48, 49 and 59. Still farther along on the shaft 97 is still another bevel gear 102 (see Figs. 2 and 4), which meshes with a bevel gear 103 on the vertical shaft 39. This shaft drives the conveyer 47 by means of the sprocket 41. Just above the sprocket 41 on the shaft 39 (see Fig. 4) is a bevel gear 104, which meshes with a bevel gear 105 on a stub shaft 106. This shaft 106 has fixed thereon a gear 107, which meshes with a pinion 108 on a shaft 109. This shaft 109 has on the end thereof a sprocket gear 110, which drives a chain 112, which in turn drives the sprocket chains 57 and through them the stripper shafts 55. The rotatable stalk choppers 26 are driven by the conveyer chains 47, 48 and 49. The conveyer shafts 33 and 34, although in line with the chopper blade shafts 27, are not the same shafts, but are broken in the bearings, so that they revolve independently. On the shafts 33 and 34 are gears 113, which mesh with pinions 114 on shafts 115, which have gears 116 on their opposite ends meshing with pinions 117 on the chopper shafts 27. Thus the chopper knives 26 are driven at a greatly increased speed.

In the operation of the device, the carriage 1 is drawn alongside the row of sugarcane to be cut, by mules or horses attached to the pole of the carriage. The stalk chopper frame 11 is adjusted at the height above the ground at which it is desired to cut the cane; the guides 24 direct the stalks into the path of the chopper knives 26, which are rotating at a high rate of speed. These knives cut the stalks near the ground, which stalks are immediately seized by the conveyer fingers 51 and slid up the incline on the apron 30, the stalks still remaining substantially vertical. When the stalks have reached the end of the short conveyer 50, they are then exposed to the beating action of the revolving chains 56 on the stripper 52. These chains 56 tear or strip off the lower leaves from the stalks. While being stripped, the stalks are being conveyed still farther until they pass the stripper, when they are deflected by means of the boot 67 into the path of the fingers on the conveyers 59 and 62, which tend to throw the tops outwardly onto the guide or supporting conveyer 68. This supporting conveyer 68 inclines upwardly and outwardly, and is substantially parallel to the top cutter 74, from the knives of which it supports the stalk for periods varying according to the height and strength of the stalks. The shortest stalks reach soonest a point on the supporting guide conveyer 68, where their lack of stiffness near the top causes them to bend or sag into the path of the knives 76 on the top cutter. Gradually as the stalks are conveyed to the higher portions of the guide conveyer 68 and the top cutter 74, the taller stalks reach a point where they sag into the path of the knives 76. The cane stalks proper and the tops fall over the side of the wagon and to the ground. A conveyer, however, may be provided for catching the cane and delivering it to a suitable wagon or receptacle.

Having thus described my invention, what I claim as new and desire to secure by Letters Patent is:—

1. In a device of the class described, the combination with a frame, of a top cutter consisting of two conveying chains, one parallel with the frame, the other obliquely above the frame, having the distance between the top and bottom chains at the starting end less than at the opposite end, and a knife parallel with the top chain and in a plane slightly below the plane in which lie the two conveying chains.

2. In a device of the class described, the combination with a supporting frame, of a stationary cutter-bar on said frame, and a longitudinally movable cutter connected to said cutter-bar and adapted to automatically cut off the tops of stalks of varying lengths at equal distances from the tips of said stalks.

3. In a device of the class described, the combination with a frame, of a stationary cutter-bar connected to said frame, and a longitudinally movable cutter connected to said cutter-bar and adapted to automatically cut stalks at varying distances from their butts, dependent on the length of the stalk.

4. In a device of the class described, the combination with a supporting frame, of cutting mechanism definitely located with respect to said frame and having movable parts, said cutting mechanism being adapted to cut off the tops of stalks of varying lengths at varying distances from their butts, dependent on the length of said stalks.

5. In a device of the class described, the combination with a supporting frame, of a top cutter adapted to cut the tops from stalks, comprising a cutter-bar inclined away from said frame and a knife sliding in the same, and a guide inclined away from said frame and located in coöperative relation with said cutter and adapted to hold said stalks away from said top cutter.

6. In a device of the class described, the combination with a supporting frame, of an upwardly and outwardly inclined top cutter adapted to cut the tops from stalks, and an upwardly and outwardly inclined guide located in coöperative relation with said cutter and adapted to support said stalks away from said cutter.

7. In a device of the class described, the combination with a frame, of a top cutter inclined away from said frame, and a stalk guide inclined away from said frame and supported by said frame above said top cutter.

8. In a device of the class described, the combination with a frame, of an obliquely arranged top cutter on said frame, and an obliquely inclined stalk guide supported by said frame above said top cutter.

9. In a device of the class described, the combination with a frame, of a top cutter on said frame disposed in angular relation with respect to said frame, and a stalk guide supported by said frame above said top cutter and arranged in angular relation with respect to said frame.

10. In a device of the class described, the combination with a frame, of a top cutter supported by said frame, a guide located in coöperative relation with said cutter, driving mechanism on said frame, means between said driving mechanism and said top cutter adapted to drive said top cutter, and means between said motor and said guide adapted to drive said guide.

11. In a device of the class described, the combination with a frame, of a top cutter, comprising a cutter-bar and a knife having a slot therein, driving mechanism on said frame, a crank operating in said slot to reciprocate said cutter-bar, a universal connection between said driving mechanism and said crank, a guide conveyer located in coöperative relation with said cutter, a shaft adapted to drive said conveyer, and a universal drive between said driving mechanism and said shaft.

12. In a device of the class described, the combination with a frame, an apron on said frame, a conveyer co-acting with said apron, a stripper on said frame, a top cutter connected to said stripper, and an endless conveyer intermediate said stripper and said top cutter, for conveying stalks from said stripper to said top cutter.

13. In a device of the class described, the combination with a frame, of a stripper on said frame, means for conveying stalks to said stripper, an automatic top cutter on said frame, and an endless conveyer intermediate said stripper and said top cutter, for conveying stalks from said stripper to said top cutter.

14. In a device of the class described, the combination with a frame, of a top cutter connected to said frame, a leaf stripper connected to said frame, comprising a frame, a plurality of superposed rotatable shafts on said last-mentioned frame, and stripping chains connected to each of said shafts in spaced relation.

15. In a device of the class described, the combination with a top cutter, of a leaf stripper connected to said top cutter, comprising a frame, a plurality of superposed rotatable shafts connected to said frame, and a plurality of stripping chains secured to each of said shafts in spaced relation, the chains on each shaft being staggered with relation to the chains on the juxtaposed shaft.

16. In a device of the class described, the combination with a frame, of an obliquely arranged top cutter connected to said frame, and an obliquely arranged stalk guide extending in juxtaposition to said top cutter.

In testimony whereof I have signed my name to this specification in the presence of two subscribing witnesses.

HENRY TOUTANT-BEAUREGARD

Witnesses:
WILLIAM DONALDSON,
HENRY L. DARPY.